Figure 1:
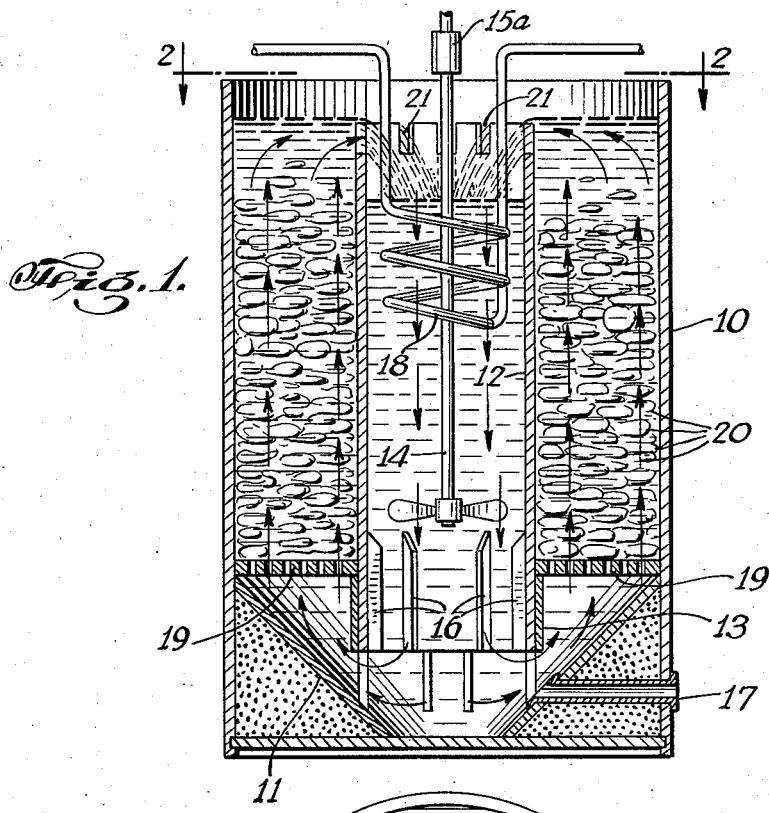

March 22, 1938.  G. PLEWS  2,111,727
IRON OXIDE PIGMENT
Filed Jan. 30, 1937

INVENTOR
GEORGE PLEWS
BY
ATTORNEYS

Patented Mar. 22, 1938

2,111,727

UNITED STATES PATENT OFFICE 2,111,727

IRON OXIDE PIGMENT

George Plews, Berkeley, Calif., assignor to C. K. Williams & Co., Easton, Pa., a corporation of Pennsylvania Application January 30, 1937, Serial No. 123,124

3 Claims. (Cl. 134—59)

This invention relates to the production of iron oxide for the manufacture of pigments by the oxidation of metallic iron, and has for its object the improvement in the quality, color and purity of the iron oxide pigments.

In my application Ser. No. 624,987, filed July 27, 1932, and of which this application is a continuation in part, I have described a method for producing iron oxide pigments, and particularly yellow iron oxides, having improved properties in regard to grain structure or particle size, color, tinting strength, etc., and have claimed the process by which these improved results are brought about.

In the practice of this process using sodium hydroxide or other alkali metal hydroxides for producing the starter solution, it is possible to produce pigments having superior properties over those previously produced in this manner, and it is the object of this invention to set forth the methods of production and claim these improved pigments per se.

In the production of iron oxide pigments in accordance with the Penniman and Zoph United States Letters Patent No. 1,368,748, using lime or calcium hydroxide in producing the starter solution, as specified therein, a substantially insoluble calcium sulphate is precipitated in the solution, which continues through the oxidation procedure and into the final pigment so that the final iron oxide pigment will contain from 5 to 15% (usually around 6% to 8%) of calcium sulphate therein.

The presence of this large amount of calcium sulphate having no tinting or hiding power reduces the strength of the iron oxide pigment for all general uses, and in specific fields often interfered seriously with the use of iron oxide pigments of this type.

In the rubber industry the calcium sulphate has a marked retarding effect on the time required to cure rubber compounds. In the leather finishes and wall paper finishes and aqueous emulsion or suspension paints, the calcium sulphate in the pigment flocculates the composition and will tend to throw down the pigment, and in the final paint film the calcium sulphate will effloresce to the surface and cause the paint to bloom.

All of these objections to prior pigments of the type described herein are overcome if substantially pure iron oxide pigments are produced by avoiding the formation of insoluble precipitates in the solutions being oxidized to produce these pigments.

The processes described herein provide iron oxide pigments which are substantially free from adulterants and products of no pigment value (particularly calcium sulphate) and which can be produced in lighter shades of yellows than is possible by the prior methods of producing iron oxide pigments.

In the prior practice of producing these pigments, it has been customary to produce the iron oxide in the presence of a ferrous sulphate solution, by the use of a limited amount of metallic iron and a copious supply of oxygen which is blown through the solution thereby to oxidize the ferrous sulphate to ferric sulphate, which ferric sulphate is in turn reduced by the metallic iron present to ferrous sulphate, forming a cyclic process for the production of iron oxide from the metallic iron. In order to control the structure of the iron oxide particles and to prevent a crystalline formation thereof which is undesirable for pigment properties, it is necessary according to the prior practice to use a starter solution of colloidal ferric hydrate, produced by precipitating ferrous hydrate from ferrous sulphate by the use of lime and then oxidizing the ferrous hydrate to ferric hydrate. The use of a starter solution prepared in this way introduces into the final pigment insoluble calcium sulphate in amounts often as high as 11% to 15% of the iron oxide content of the pigment. This inert and substantially insoluble calcium sulphate as described above is detrimental to the quality and color of the final iron oxide pigment.

I have discovered that the copious use of oxygen by means of air blown through the iron salt solution is unnecessary and that a final product of superior quality and color can be produced by the use of a limited amount of oxygen which causes slow oxidation of the iron to ferric oxide.

I have also discovered that better color can be produced in the final pigment if the oxidation of ferrous sulphate to ferric sulphate as directed in the previous processes is substantially completely avoided. Hence, in practice of the present invention, contact of the ferrous sulphate solution with oxygen is restricted to such degree as will avoid any appreciable oxidation of the ferrous sulphate. The acidity of the solution is thus maintained at a low pH value and should be maintained preferably between the pH values 3.2 and 3.6.

In order to compensate for the reduced rate of oxidation of the individual iron particles in my process, I have found it desirable to increase the normal amount of metallic iron present in the solution so that although a slow rate of oxidation of the individual iron particles is maintained, thereby improving the range of colors toward the light yellow oxides, the greater amount of iron present permits a high average rate of corrosion and does not reduce the final yield of the desired product.

In order to control and limit the rate of oxidation, it is necessary to control and to limit the quantity of oxygen dissolved or introduced into the solution in which the iron is oxidized. Ferrous sulphate in circulation can of itself absorb oxygen from the air at such a rapid rate as to produce oxidation of the iron more rapidly than desired in my preferred practice. This results in a large grain structure for the ferric oxide and inferior color values tending toward brown and red colors.

In my preferred oxidation procedure, by depending upon absorption of oxygen from the atmosphere, either at the surface or by introduction below the surface of the solution, I limit the amount of oxygen dissolved in the iron salt solution by adjustment of the mobility and of the rate of flow or circulation of the iron salt solution past the metallic iron particles and in contact with the atmosphere to thereby bring within ready control the rate of oxidation of the metallic iron particles. The quantity of oxygen dissolved and the mobility or rate of flow of the iron salt solution can be reduced in many ways. The presence of a second soluble sulphate, as for example, sodium sulphate, in the ferrous sulphate solution will materially reduce the solubility of oxygen in the ferrous sulphate. It has, however, been found extremely important for best results that the circulation of the salt solution be effected in an evenly flowing stream without violent disturbance or agitation of any part of the flowing mass.

I have found that the mobility and oxygen solubility of the ferrous salt solution in which the metallic iron particles are placed for the purpose of oxidation may be controlled in several ways without the introduction of insoluble materials into the solution, as for example,—

1.—By the use of an alkali metal hydroxide such as sodium, potassium, or ammonium hydroxide, etc., which precipitates from the soluble ferrous salt a highly dispersed gelatinous suspension of ferrous hydroxide capable of being oxidized to produce a gelatinous, highly dispersed suspension of ferric hydroxide of high consistency. This latter material is particularly suitable as an oxidation control medium for the iron oxide particles, controlling the form of the ferric oxide precipitated during the oxidation reaction.

2.—By the addition of easily saponifiable oils, fats, or waxes to alkali metal hydroxides, such as sodium, potassium, ammonium hydroxide, etc., for the precipitation of ferrous hydroxide from the soluble ferrous salts, which ferrous hydroxide thus produced can be oxidized under controlled conditions to a gelatinous suspension of ferric oxide of high consistency, low mobility and low oxygen solubility.

Other ways of controlling the mobility and oxygen solubility of the solution to bring about a slow rate of oxidation will readily occur to persons skilled in this art.

In one method of operating my process to produce iron oxide pigment free from insoluble impurities for preparing the starting pulp, I take ferrous sulphate, say 3400 pounds, and about 800 pounds of sodium hydroxide, which with the amount of ferrous sulphate stated will produce approximately 1400 pounds of sodium sulphate in solution and a corresponding amount of ferrous hydrate, roughly one thousand seventy-two (1,072) pounds. This precipitate is produced preferably at room temperature. With the amounts of ferrous sulphate and sodium hydroxide mentioned, I use water enough to make about 3000 gallons of pulp, but this amount may be varied considerably. The resulting mass, of a rather gelatinous consistency, is now under controlled conditions, agitated in the presence of air so that the oxygen needed for oxidation of the ferrous hydrate to ferric hydrate will be taken up by the pulp either by absorption from the air at the surface of the solution or by bubbling air therethrough. This agitation and absorption of oxygen may be conveniently effected in an apparatus of the type hereinafter described in which, however, no metallic iron is present during the preliminary clarification stage.

When the color of the starting precipitate has been converted to yellow by slow oxidation (which usually requires about 24 hours) the pulp is diluted to about 5,000 gallons and transferred to a larger apparatus, in which it is passed over metallic iron (preferably mild steel in the form of scrap), the circulation being effected mechanically by means of a propeller, air jet or other flow control or circulating device, with absorption of oxygen from the air. This operation is conducted preferably at 145° F. and the oxygen absorption is kept low enough to prevent the objectionable browning and coarsening due to too rapid oxidation above referred to. During this stage a layer of hydrated oxide which may be from $\frac{1}{16}$" to $\frac{1}{8}$" thick and ranging from a pale green color at the iron surface to a yellow color on the outside is formed on the iron.

The simplest method of keeping the oxygen absorption down to a safe rate is by regulation of the speed of circulation, starting with a slow rate and increasing it until by observation of the consistency of the pulp, the paling of the color to a cream shade, and the circulation speed at which a brownish cast begins to appear or fails to disappear, a safe rate is found. Usually from about three to four days' treatment is required to bring the material to the shade mentioned. In this stage as in the first the oxidation of ferrous sulphate is deleterious and it is for this reason that the oxygen absorption is kept down by regulating the circulation rate to avoid a brownish cast in the oxidized initial precipitate and in the hydrated ferric oxide produced by oxidation of hydrated ferrous oxide formed on the iron.

As the operation proceeds the color of the material deepens, becoming yellower and yellower and also brighter. Before the desired shade is reached, the pulp may get too thick, slowing up too much the absorption of oxygen and corrosion of the iron, or requiring an excessive amount of power to propel the pulp over the iron. In such case the pulp may be diluted as by dividing it up in separate apparatus and adding fresh sulphate solution as described above, with the circulation adjusted to a lower rate to suit the greater mobility of the pulp. Such dilution may be resorted to as often as necessary or desirable to keep the process going at an efficient rate of yield.

When the solution reaches the desired color, further circulation of the solution over the iron is stopped, the solution being withdrawn from the corrosion tank and the ferric oxide filtered therefrom, which oxide is then either washed and dried to produce the desired yellow pigment, or is calcined to produce deeper shades of red pigments. The oxide may be readily washed free of sodium sulphate and if after washing, it still contains traces of ferrous sulphate, this may be neutralized with barium hydroxide or other neutralizing material which will not introduce undesirable impurities into the final product. If the wash water used is hard and contains calcium salts, calcium sulphate may unavoidably be deposited in the iron oxide mass, but the amount will not exceed over one and one half per cent.

The yellow oxides obtained in accordance with the foregoing process are characterized by a high color purity of not less than 63, a brightness generally greater than that of comparable yellow iron oxide pigments produced by prior processes and usually of between 25 and 31, and a dominant wave length usually between 581 and 583 millimicrons, as measured by illuminant "C". The spectrophotometric measurements, standards and computations used in obtaining these qualities are those which are conventionally employed by chemists in leading optical laboratories throughout the country, the computations involved in converting the spectrophotometric data to brightness, dominant wave length and purity being described in the "Handbook of Colorimetry" published by the Massachusetts Institute of Technology in 1936. Illuminant "C" is the standard illuminant adopted for this purpose and reported by the International Commission on Illumination in 1931.

In the preferred practice of my process, I use an apparatus in which the ferrous salt solution which acts as the oxygen carrier may be circulated over or through a mass of metallic iron particles and in which the rate of flow and the exposure of the salt solution to the air or oxidizing influence may be readily controlled to limit the rate of absorption of oxygen from the air and the rate of oxidation of the iron particles. It will be understood, however, that the superior pigment herein described may be produced in any other form of apparatus in which the methods of control herein described may be practiced.

In the apparatus shown by way of illustration, Figure 1 shows in sectional view a preferred embodiment of apparatus for practicing my process.

Figure 2:
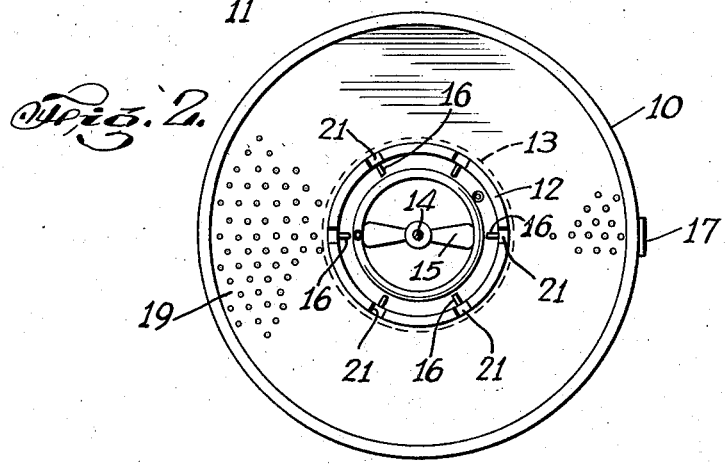

Figure 2 is a plan view on line 2—2 of the empty apparatus shown in Figure 1.

In the form of embodiment of apparatus shown, an outer vessel or tank 10 is provided having a conical bottom 11 on which the inner vessel or tube 12 opens at the top and bottom and is supported by means of brackets 13. An agitation and circulation device, such as a propeller or pump 15, is provided preferably in the inner vessel, and is rotated by means of a shaft 14 driven through a suitable change speed mechanism indicated at 15a which may be of a continuously variable type to permit regulation of the circulation rate as desired. The inner vessel at its bottom may be equipped with a number of baffles, such as 16, to break up the swirling effect of the solution produced by the propeller.

A discharge opening 17 is provided having a removable closure, not shown. Heating coils 18 may be provided through which steam, hot water, or other suitable heating medium may be passed to heat the treating solution. The metallic iron particles 20 consisting preferably of sheet steel are preferably supported on a false bottom 19 removably mounted on the brackets 13. The rotation of the propeller is preferably in the direction to produce downward flow of the solution in the inner vessel and upward flow around the particles in the outer vessel. Slots may be provided at the upper edge of the inner vessel as indicated at 21 to form a weir for dividing the solution cascading over the edge of the inner vessel to thereby increase or decrease the surface exposure to the air and consequently control the absorption of oxygen from the air.

It is to be understood, however, that the arrangement of apparatus described is suggestive only and that any other suitable design or arrangement might be used in which the salt solution may be circulated at a controlled rate over or through the metallic iron particles and at some point in the circulation be exposed to the absorption of oxygen from the air, thereby to convey the oxygen to the metallic iron particles to control the rate of oxidation thereof.

By using sodium hydroxide in the production of the starter solution in the processes herein described, no inert or objectionable insoluble material is carried through into the final oxide and a pigment consisting only of hydrated iron oxide and containing less than one per cent. of impurities may be produced.

The pure iron oxide yellow pigments produced by the process herein described therefore have greater hiding and tinting strength than the impure yellows and may be satisfactorily used in leather finishes, wall paper finishes, rubber colors, concrete colors, etc., where the calcium sulphate yellows have heretofore proved unsatisfactory.

While I have described specific detailed methods for practicing my process to enable others to practice it, it will be understood that various modifications and changes may be made therein without departing from the spirit of my invention or the scope of the appended claims.

I claim:

1. The iron oxide pigment having a color purity of not less than 63 and a brightness of not less than 25 when measured by illuminant "C", said pigment being produced by establishing a suspension of yellow ferric hydrate in a liquor containing ferrous and sodium sulphates in solution and in which metallic iron is immersed; circulating the liquor and suspended hydrate over the iron while supplying sufficient oxygen to the liquor by absorption from the atmosphere to oxidize hydrated ferrous oxide without substantial oxidation of ferrous sulphate; increasing the circulation rate as mobility decreases and increasing the mobility of the mass with an increase in circulation rate to produce a high corrosion rate with production of a yellow precipitate of oxidized hydrate free from brownish cast or discoloration and containing over 99% of hydrated iron oxide.

2. The pigment having a color purity of not less than 63 and a brightness of not less than 25 when measured by illuminant "C", said pigment being produced by establishing a suspension of ferric hydrate in a liquor containing in solution ferrous sulphate and sodium sulphate adapted to impede the oxidation of ferrous sulphate, circulating the liquor and suspended hydrate over metallic iron, and contacting the circulating mass with air whereby oxygen is taken up at a rate which oxidizes ferrous hydrate substantially as fast as formed without material oxidation of the ferrous sulphate and with the production of a yellow precipitate containing over 99% of hydrated iron oxide.

3. A yellow iron oxide pigment having a color purity of not less than 63 and a brightness of not less than 25 when measured by illuminant "C", said pigment being produced by establishing a suspension of ferric hydrate in a liquor containing in solution ferrous sulphate and a soluble sulphate adapted to impede the oxidation of ferrous sulphate, circulating the liquor and suspended hydrate over metallic iron, and contacting the circulating mass with air whereby oxygen is taken up at a rate which oxidizes ferrous hydrate substantially as fast as formed without material oxidation of the ferrous sulphate, removing the soluble sulphate and drying to produce the yellow oxide pigment.

GEORGE PLEWS.